(12) United States Patent
Kwong et al.

(10) Patent No.: US 8,379,060 B2
(45) Date of Patent: Feb. 19, 2013

(54) DEVICE, SYSTEM, AND METHOD OF DISPLAY CALIBRATION

(75) Inventors: Wah Yiu Kwong, Beaverton, OR (US); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 994 days.

(21) Appl. No.: 11/964,024

(22) Filed: Dec. 25, 2007

(65) Prior Publication Data
US 2009/0160878 A1 Jun. 25, 2009

(51) Int. Cl.
*G09G 5/10* (2006.01)
(52) U.S. Cl. ........ 345/690; 345/102; 345/207; 345/589; 345/593; 345/901; 361/679.27; 455/575.3
(58) Field of Classification Search .................. 345/207, 345/690, 589, 593, 102, 901; 361/679.27; 455/575.3
See application file for complete search history.

(56) References Cited

U.S. PATENT DOCUMENTS

| | | | |
|---|---|---|---|
| 5,818,924 A * | 10/1998 | King et al. | 379/433.13 |
| 5,886,668 A * | 3/1999 | Pedersen et al. | 343/702 |
| 7,218,358 B2 * | 5/2007 | Chen et al. | 348/658 |
| 7,782,345 B2 * | 8/2010 | Evanicky et al. | 345/690 |
| 2001/0043188 A1* | 11/2001 | Nakamura | 345/102 |
| 2004/0026136 A1* | 2/2004 | Hill et al. | 178/18.01 |
| 2004/0119684 A1* | 6/2004 | Back et al. | 345/156 |
| 2005/0151716 A1* | 7/2005 | Lin | 345/102 |
| 2005/0210722 A1* | 9/2005 | Graef et al. | 40/452 |
| 2005/0212824 A1* | 9/2005 | Marcinkiewicz et al. | 345/690 |
| 2006/0181552 A1* | 8/2006 | Hopple | 345/690 |
| 2007/0210992 A1* | 9/2007 | Schein | 345/76 |
| 2008/0278637 A1* | 11/2008 | Johnson et al. | 348/748 |
| 2009/0033676 A1* | 2/2009 | Cybart et al. | 345/589 |

* cited by examiner

*Primary Examiner* — Lun-Yi Lao
*Assistant Examiner* — Sosina Abebe
(74) *Attorney, Agent, or Firm* — Kacvinsky Daisak PLLC

(57) ABSTRACT

Device, system, and method for display calibration. For example, an apparatus includes: one or more color sensors, embedded within a body of a mobile device, to measure one or more color attributes of a visual element displayed by a display unit of the mobile device when a lid of the mobile device is in a closed position; and a color calibrator to calibrate one or more parameters of the display unit based on the one or more color attributes measured by the one or more color sensors.

13 Claims, 3 Drawing Sheets

DEVICE, SYSTEM, AND METHOD OF DISPLAY CALIBRATION

BACKGROUND

A computing system may include, for example, a screen or a monitor to display text and images processed or stored in the computing system. The screen may be able to display color visual elements, for example, colored images, photographs, video broadcasts, windows, or the like.

Unfortunately, the colors displayed on the screen may autonomously change during the operation of the computing system, or in the course of time. For example, the screen may display visual elements having incorrect colors (for example, pink instead of red).

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
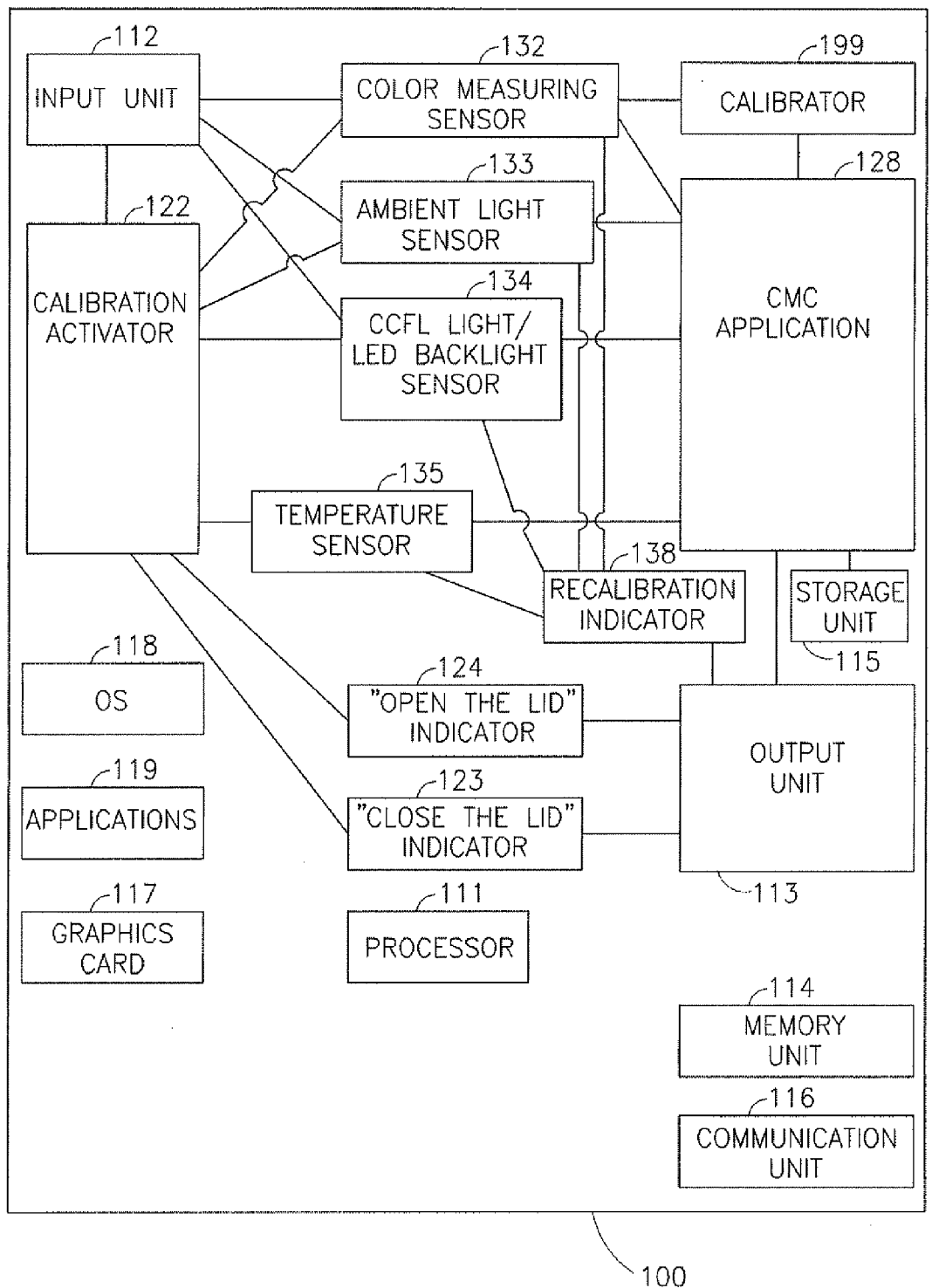
FIG. 1 is a schematic block diagram illustration of a system able to perform display calibration in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

The terms "lid" or "cover" as used herein include, for example, the physical portion of a mobile computer or a laptop computer having or containing the display or display unit of the computer, or a portion or a "half" of a mobile computer or laptop computer having or containing the display or display unit. The term "lids" or "covers" as used herein includes, for example, multiple lid units or cover units, for example, of a mobile or laptop computer having multiple displays.

FIG. 1 schematically illustrates a block diagram of a system 100 able to perform display calibration in accordance with some demonstrative embodiments of the invention. System 100 may be or may include, for example, a computing device, a computer, a Personal Computer (PC), a server computer, a client/server system, a mobile computer, a portable computer, a laptop computer, a multi-display laptop computer, a multi-screen laptop computer, a notebook computer, a tablet computer, a network of multiple inter-connected devices, or the like.

System 100 includes, for example, a processor 111, an input unit 112, an output unit 113, a memory unit 114, a storage unit 115, a communication unit 116, and a graphics card 117. System 100 may optionally include other suitable hardware components and/or software components.

Processor 111 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 executes instructions, for example, of an Operating System (OS) 118 of system 100 or of one or more applications 119.

Input unit 112 includes, for example, a keyboard, a keypad, a mouse, a touch-pad, a track-ball, a stylus, a microphone, or other suitable pointing device or input device. Output unit 113 includes, for example, a monitor, a screen, a Cathode Ray Tube (CRT) display unit, a Liquid Crystal Display (LCD) display unit, a Light Emitting Diode (LED) display unit, an Organic LED (OLED) display unit, a plasma display unit, one or more audio speakers or earphones, or other suitable output devices. Graphics card 117 includes, for example, a graphics or video processor, adapter, controller or accelerator.

Memory unit 114 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 115 includes, for example, a hard disk drive, a floppy disk drive, a Compact Disk (CD) drive, a CD-ROM drive, a Digital Versatile Disk (DVD) drive, or other suitable Removable or non-Removable storage units. Memory unit 114 and/or storage unit 115, for example, store data processed by system 100.

Communication unit 116 includes, for example, a wired or wireless Network Interface Card (NIC), a wired or wireless modem, a wired or wireless receiver and/or transmitter, a wired or wireless transmitter-receiver and/or transceiver, a Radio Frequency (RF) transceiver or communication unit, or other units able to transmit and/or receive signals, blocks, frames, transmission streams, packets, messages and/or data. Communication unit 116 optionally includes, or is optionally associated with, one or more antennas, for example, a dipole antenna, a monopole antenna, an omni-directional antenna, an end fed antenna, a circularly polarized antenna, a microstrip antenna, a diversity antenna, or the like.

In some embodiments, components of system 100 may be enclosed in a common housing or packaging, and may be interconnected or operably associated using one or more wired or wireless links. In other embodiments, components of system 100 may be distributed among multiple or separate devices or locations, may be implemented using a client/server configuration or system, or may communicate using remote access methods.

In some embodiments, system 100 is implemented as a laptop computer, having a lid portion and a base portion, interconnected through a common axis or pivot that allows opening and closing of the laptop computer, e.g., similar to opening and closing of a book. The lid portion or its body includes a display unit embedded therein, which may be calibrated in accordance with some embodiments of the invention.

System 100 may additionally include a calibration activator 122, able to initiate or activate the calibration process. In some embodiments, calibration activator 122 may be, for example, a button, a mouse button, a keyboard key, a stand-alone application, an application or program which is part of OS 118, a driver, or the like. In some embodiments, for example, when system 100 is implemented as a mobile or a laptop computer, calibration activator 122 may activate an application, temporarily overriding pre-programmed functions associated with a closing switch of the lid. Accordingly, calibration activator 122 may initiate the maintaining of the display(s) active, even while the lid of the mobile computer or laptop computer is being closed or is hermetically closed.

In some embodiments, calibration activator 122 may be connected to and/or activate one or more sensors, for example, one or more Color Measuring (CM) sensors 132, one or more Ambient Light (AL) sensors 133, one or more Cold-Cathode-Fluorescent-Lamp (CCFL) light or LED backlight sensors 134, and/or one or more temperature sensors 135. Sensors 132-135 may be located in different portions of system 100, for example, as detailed herein with reference to FIGS. 2A-2C. In some embodiments, sensors 132-135 may be embedded within the body or housing of system 100, for example, in the lid of the mobile computer, in the frame surrounding the display of the mobile computer, on the back or side of the lid of the mobile computer.

The one or more CM sensor(s) 132 is/are able to scan the display and measure multiple attributes thereof, for example: color, contrast, brightness, hue, saturation, or other attributes. The AL sensor 133 is able to measure multiple attributes of ambient light, for example: strength, brightness, color, shade, direction, or the like. The sensor 134 is able to measure and/or monitor CCFL light or LED backlight, for example, of a LCD unit. The temperature sensor 135 is able to measure the temperature in the surrounding of the display of system 100.

In some embodiments, for example, in which system 100 is implemented as a mobile or laptop computer, calibration activator 122 may activate a "close the lid(s)" indicator 123. "Close the lid" indicator 123 may include, for example, a message displayed on the display(s), an audible signal, a blinking signal, or the like. "Close the lid" indicator 123 may alert the user to close the display(s), for system 100 to perform the calibration process.

In some embodiments, for example, in which system 100 is implemented as a mobile or laptop computer, CM sensor(s) 132 may be located in one or more suitable locations on the top surface of the keyboard portion. This may allow, for example, for CM sensor 132 to face the display, or at least a portion thereof, when the lid is closed.

In some embodiments, for example, after CM 132 is activated by calibration activator 122 and the lid is closed, the display remains active. A Color and Management Calibration (CMC) application 128 activates a visual element, causing the image to be displayed on the display or on a portion thereof, for example, on the portion of the display faced by CM sensor 132. The visual element includes, for example, graphical signals or images, representing the display image at the time of calibration. The CM sensor 132 automatically scans the visual element, and measures the attributes thereof.

In some embodiments, system 100 may be a mobile computer including two displays, namely, a first display and a second display. Accordingly, a first CM sensor 132 or a first set of CM sensors 132 may be located to face the first display when the first lid is closed; and a second CM sensor 132 or a second set of CM sensors 132 may be located to face the second display when the second lid is closed. During calibration, when both lids are closed, the first CM sensor 132 or set of CM sensors 132 scan a first visual element, generated by the first display; whereas the second CM sensor 132 or set of CM sensors 132 scan a second visual element, generated by the second display. The first and second displays may then be calibrated based on the data measured by the first and second CM sensors 132, or sets of CM sensors 132, respectively.

In some embodiments, calibration activator 122 may additionally activate one or more AL sensors 133. In some embodiments, in which system 100 is a mobile computer or a laptop computer, one or more AL sensors 133 may be located on the top or outer surface of the display portion. In other embodiments, one or more AL sensors 133 may be located in other suitable places, for example, along the sides of the keyboard portion, along the sides of the display portion, or in other suitable locations. In some embodiments, during the calibration process, while the lid(s) is/are closed and CM sensors 132 scan the display(s), the one or more AL sensors 133 may face the surrounding of the computer, automatically measuring the ambient light and attributes thereof, surrounding the display(s). In some embodiments, for example, in which system 100 is a mobile computer or a laptop computer including two displays, AL sensors 133 may be located on both displays or in the vicinity thereof. This may allow, for example, measurement of different or multiple ambient lights surrounding each display, thereby allowing to calibrate each display separately or independently, taking into account the possibly different multiple ambient lights. The ambient light measurement, as measured by AL sensors 133, is stored and brought into account during the calibration process. This may allow to calibrate the display(s) to show an image, generally matching the image shown in output devices, to which the image is transferred. For example, photographs, magazine papers, HDTV broadcasts, or the like.

In some embodiments, calibration activator 122 may additionally activate one or more CCFL light or LED backlight sensors 134. For example, if system 100 includes a LCD unit, sensor 134 may measure the CCFL light and/or the LED backlight of the LCD, while sensors 132 and 133 are active. The sensors 134 may be located in any suitable portion of system 100 to measure the CCFL light and/or the LED backlight of the LCD.

In some embodiments, calibration activator 122 may additionally activate a temperature sensor 135. For example, in which system 100 is a mobile or a laptop computer, temperature sensor 135 may be located in any suitable portion of the computer, measuring the temperature of the surrounding air.

The temperature measured by the temperature sensor 135, as well as changes thereof, may be substantially continuously monitored, and may be taken into account, for example, in order to determine recalibration, and/or as part of the calibration process.

In some embodiments, for example, in which system 100 is a mobile or a laptop computer, once the sensors 132-135 complete the measuring process, a signal, for example, an audible signal or a visual signal generated by an "open the lid" indicator 124, may alert the user that the multiple measurements are completed. In some embodiments, for example, in which system 100 is a mobile or a laptop computer including two displays, CM sensors 132 may automatically perform measurements separately, or independently on each display.

In some embodiments, the data received from the sensors 132-135 may be stored, for example in memory unit 114, and may be processed using the CMC application 128. CMC application 128 may receive the data from the sensors 132-135, and may perform a calibration process, for example, using processor 111. In some embodiments, after the calibration process is complete, the calibrated image is displayed on the display(s), that is/are part of, for example, output unit 113. In some embodiments, for example, in which system 100 is a mobile or a laptop computer, once the calibration process is complete, a user that operates system 100 may open the lid(s) and see the calibrated image on the display(s). In some embodiments, CMC application 128 may calibrate the display(s), such that the image seen in the calibrated display(s) generally corresponds to the image seen in output devices, for example: photographs, magazine papers, HDTV broadcasts, or the like.

In some embodiments, system 100 may include a recalibration indicator 138. In some embodiments, recalibration indicator 138 may be connected to or associated with one or more of sensors 133-135, and may initiate sensors 133-135 to perform the herein-described measurements, periodically or substantially continuously. The recalibration indicator 138 may store the data received from the sensors 133-135, In some embodiments, recalibration indicator 138 may retrieve the stored data in order to process the data, and may detect a change in conditions (for example, a change of ambient light, temperature, CCFL light and/or LED backlight) measured by sensors 133-135. The RI 138 may calculate and determine whether or not the change in conditions exceeds a pre-defined threshold. For example, in case the change in conditions exceeds the pre-defined threshold, an audible signal or a message shown on the display may be generated, recommending the user to perform a recalibration of the display, and allowing the user to respond to the recommendation by selecting to recalibrate the display.

In some embodiments, for example, in which system 100 is a mobile or laptop computer, a user that operates system 100 may calibrate the display(s) by pressing calibration activator 122, closing the computer lid(s), waiting for a signal, and re-opening the lid(s), substantially without additional operations required on the behalf of the user.

In some embodiments, the system may allow calibrating the display, based on multiple pre-defined International Color Consortium (ICC) profiles or based on Pantone Matching Systems colors or other color schemes or standards. For example, a user that operates the system 100 may pre-define the calibration settings to result in displaying images having characteristics of a DVD video, a magazine sheet, a photograph, or the like.

In some embodiments, for example, in which system 100 includes an OLED display, the recalibration indicator 138 may notify the user that a recalibration is recommended, for example, to compensate for one or more fading blue pixels which may be associated with some OLED displays.

In some embodiments, for example, initial calibration activated by calibration activator 122 and/or other calibration(s) activated by recalibration indicator 138, may allow performing the calibration without the need to wait for the display to warm up, e.g., at all or for a long time.

Although portions of the discussion herein relate, for demonstrative purposes, to multiple sensors and/or to multiple locations of sensors, embodiments of the invention are not limited in this regard. For example, some embodiments may include or may utilize a single sensor or a single color sensor, optionally implemented using a set of multiple sub-sensors; some embodiments may include or may utilize a single sensor able to perform the functions of multiple sensors described herein; some embodiments may include or may utilize a set of sensors or sub-sensors, co-located or spatially separated or distanced, able to perform the functions of multiple sensors described herein; some embodiments may utilize a single-location sensor, a single-location set of sensors, a multiple-location sensor, or a multiple-location set of sensors; or the like. In some embodiments, calibration operations may be based on measurement(s) performed by a single sensor, by multiple sensors, by a set of sensors, by a sensor implemented using multiple sub-sensors, or the like.

Figure 2A:
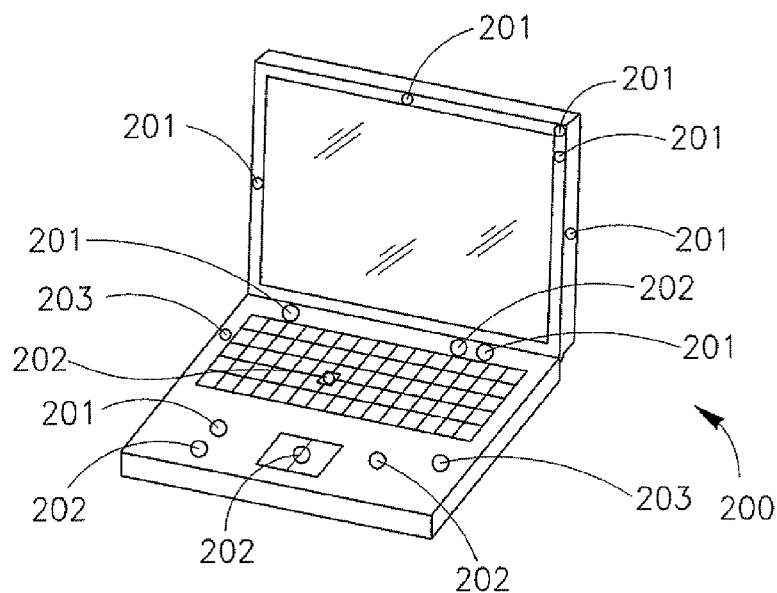
FIGS. 2A-2C are schematic illustrations of a mobile computer in accordance with some demonstrative embodiments of the invention.

FIG. 2A schematically illustrates a mobile computer in accordance with some demonstrative embodiments of the invention. FIG. 2A schematically illustrates a three-dimensional perspective of a mobile computer 200, with an open lid.

In some embodiments, mobile computer 200 may include multiple locations 201 suitable for including sensors for measuring ambient light, for example, AL sensors 133 of system 100. Locations 201 may be located, for example, along the side surface of the keyboard portion, above or below the display in the display portion, above or below the keyboard in the keyboard portion, included in the keyboard, included in the touchpad or in other suitable locations. Other suitable locations may be used.

In some embodiments, mobile computer 200 may include multiple locations 202 suitable for including sensors for measuring color, for example, CM sensors 132 of system 100.

Locations 202 may be located, for example, above, below or besides the keyboard in the keyboard portion, in the touchpad, in the keyboard, or in other suitable locations. Other suitable locations may be used.

In some embodiments, mobile computer 200 may include multiple locations 203 suitable for including sensors for measuring temperature, for example, TM sensors 135 of system 100. Locations 203 may be located, for example, above, below or besides the keyboard in the keyboard portion, in the touchpad, in the keyboard, or in other suitable locations.

Figure 2B:
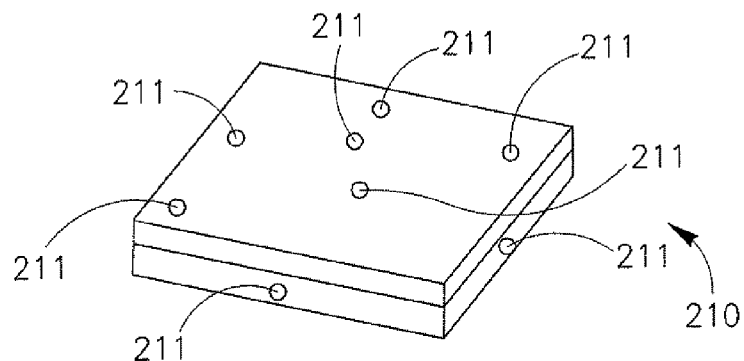

FIG. 2B schematically illustrates a mobile computer in accordance with some demonstrative embodiments of the invention. FIG. 2B schematically illustrates a three-dimensional perspective of a mobile computer 210, with a closed lid.

In some embodiments, mobile computer 210 may include multiple locations 211, suitable for including sensors for ambient light measuring, for example, AL sensors 133 of system 100. Locations 211 may be located for example, on the top or outer surface of the display portion, in the general middle area of the display portion, the general corners area of the display portion the general middle/top and/or middle/bottom area of the display portion, or in other suitable locations.

In some embodiments, the CMC application 128 may be implemented as a software component, a program, a driver, a device driver, a driver of a display unit, a driver of a graphics card, an OS component, and/or a hardware component. In some embodiments, the CMC application 128 may be associated with, or may include, or may be implemented using, a calibrator 199, for example, a calibrator component or calibrator module. The calibrator 199 may perform the calibration of the output unit 113, for example, by modifying a signal that system 100 generates to the output unit 113. The modification is based on the measurements performed by sensors 132-135, and/or based on the calculations performed by the CMC application 128.

Figure 2C:
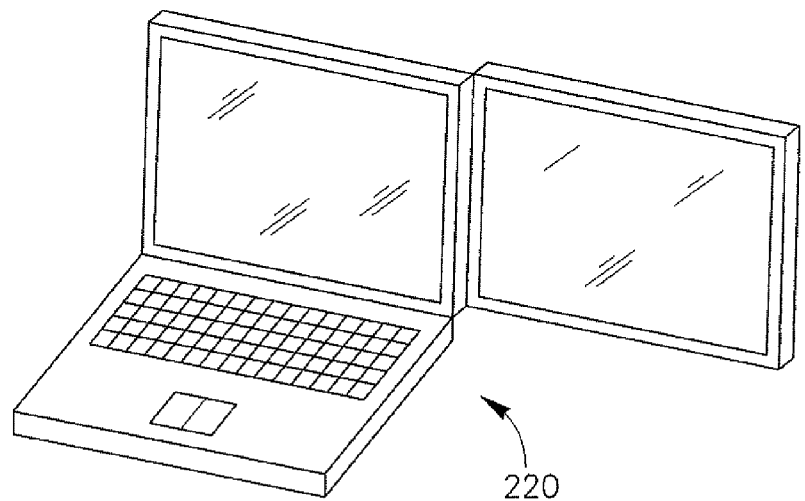

FIG. 2C schematically illustrates a mobile computer in accordance with some demonstrative embodiments of the invention. FIG. 2C schematically illustrates a three-dimensional perspective of a mobile computer 220 with two displays, in which the display lids are open.

In some embodiments, mobile computer 220, may include sensors, for example sensors 132-135, suitable for performing the above-mentioned measurements for calibrating the first display, and/or identical or similar, additional sensors 132-135, suitable for performing the above-mentioned measurements for calibrating the second display, e.g., independently, in parallel, in series, or the like.

Figure 3:
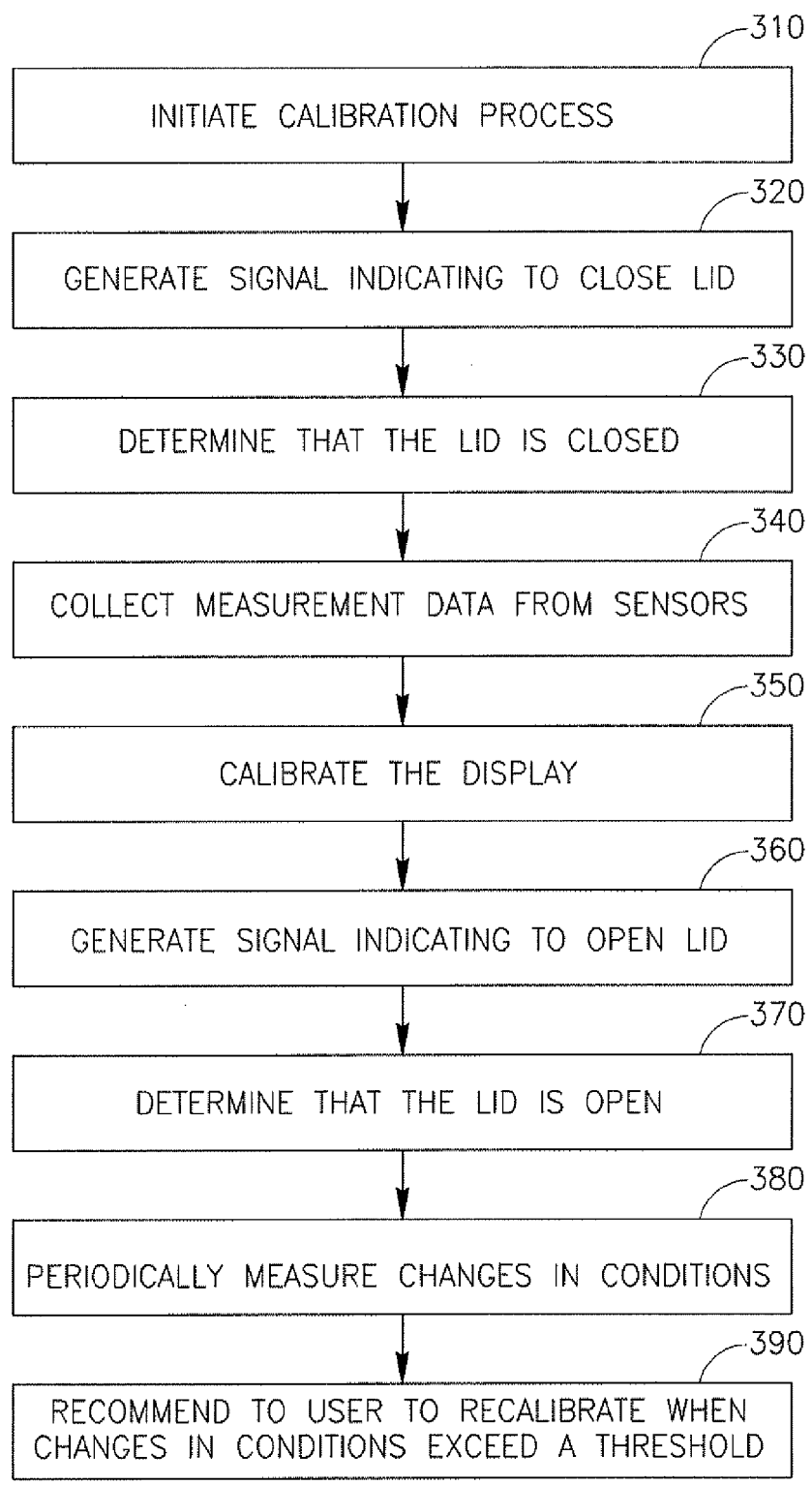
FIG. 3 is a schematic flow-chart of a method of display calibration in accordance with a demonstrative embodiment of the invention.

FIG. 3 is a schematic flow-chart of a method of display(s) calibrating in accordance with some demonstrative embodiments of the invention. Operations of the method may be used, for example, by system 100 of FIG. 1, by system 200 of FIG. 2A, by system 210 of FIG. 2B, by system 220 of FIG. 2C, and/or by other suitable units, devices and/or systems.

In some embodiments, the method may include, for example, initiating the calibration process (block 310), for example, in response to a user pressing a calibration button or activating a calibration application, as described above.

In some embodiments, the method may include, for example, generating a signal, indicating to close the lid(s) (block 320). The signal may include an audible signal, a visual signal, a message on the display, or the like.

In some embodiments, the method may include, for example, determining that the lid or lids is/are closed (block 330). This may be done performed, for example, using methods or mechanisms similar to those used for sensing the closure of a lid in a mobile computer.

In some embodiments, the method may include, for example, collecting measured data from sensors (block 340), for example, sensors 132-135 of system 100, e.g., CM sensor 132, AL sensor 133, temperature sensor 135, and/or the CCFL light/LED backlight sensor 134. This may include, for example, initiating the sensors 132-135 to start sensing and/or measuring. The initiating may be performed, for example, by calibration activator 122 of system 100, or by CMC application 128 of system 100. The collecting may additionally include, for example, waiting a pre-defined time for the sensors to perform the measurement, and storing the measured data, for example in storage unit 115 of system 100, for the calibration process to initiate.

In some embodiments, the method may include, for example, calibrating the display(s) of the laptop (block 350). The calibration of the display(s) may be performed, for example, based on data received from sensors 132-135, and stored in storage unit 115, as described above. The calibration may include taking into account the external conditions (e.g., ambient light) and internal conditions (e.g., the current color of the display, and CCFL light). In some embodiments, the calibration may yield a displayed image generally identical to the same image displayed in output devices, for example, printed photographs, HDTV broadcasting, or the like.

In some embodiments, the method may include, for example, generating a signal, indicating to open the lid(s) (lock 360), upon finishing the calibration. The signal may include, for example, an audible signal or a visual signal, for example, a blinking light generated by a small light bulb located, for example, on the outer surface of the lid portion.

In some embodiments, the method may include, for example, determining that the lid or lids are opened (block 370), for example, using the method or mechanism of block 330.

After the calibration process is complete, in some embodiments, the method may include, for example, periodically, or substantially continuously, measuring conditions and condition changes (block 380). For example, the method may include performing the above-mentioned measurements using sensors 133-135 of system 100. As described, the data received from the sensors may be stored and processed.

In some embodiments, for example, if the changes in conditions exceed a pre-defined threshold, the method may include recommending to a user to recalibrate the display(s) (block 390). The recommending may be performed, for example, by generating a message on the display(s), an audible signal, a warning signal or the like. For example, a user that operates the computer may select to accept the recommendation, and may command to initiate a recalibration, resulting in a process using the method described herein. This may be performed, for example, when a previous calibration requires updating.

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/C devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes.

What is claimed is:

1. An apparatus comprising:
one or more color sensors, embedded within a body of a mobile device, to measure one or more color attributes of a visual element displayed by a display unit of the mobile device when a lid of the mobile device is in a closed position;
one or more ambient light sensors, embedded within the body of the mobile device separate from the one or more color sensors, to measure light from a surrounding of the mobile device when the lid of the mobile device is in the closed position;
a color calibrator to calibrate one or more parameters of the display unit based on the one or more color attributes measured by the one or more color sensors and the light measured by the one or more ambient light sensors; and
an overriding mechanism or logic operative to override a pre-programmed function associated with closure of the lid of the mobile device and to maintain the display unit of the mobile device operational upon closure of the lid.

2. The apparatus of claim 1, comprising:
one or more Light Emitting Diode (LED) backlight sensors, embedded within the body of the mobile device, to measure LED backlight relative to the mobile device,
wherein the color calibrator is to calibrate one or more parameters of the display unit based on the LED backlight measured by the one or more LED backlight sensors.

3. The apparatus of claim 1, comprising:
one or more Cold-Cathode-Fluorescent-Lamp light sensors, embedded within the body of the mobile device, to measure Cold-Cathode-Fluorescent-Lamp light of the mobile device,
wherein the color calibrator is to calibrate one or more parameters of the display unit based on the Cold-Cathode-Fluorescent-Lamp light measured by the one or more Cold-Cathode-Fluorescent-Lamp sensors.

4. The apparatus of claim 1, comprising:
one or more temperature sensors, embedded within the body of the mobile device, to measure temperature from a surrounding of the mobile device,
wherein the color calibrator is to calibrate one or more parameters of the display unit based on the temperature measured by the one or more temperature sensors.

5. The apparatus of claim 1, wherein the display unit is to present a visual element upon closure of the lid of the mobile device, and wherein the visual element is to face the one or more color sensors.

6. The apparatus of claim 1, comprising:
a recalibration mechanism to initiate recalibration of the display unit of the mobile device based on a change in ambient light measured by the one or more ambient light sensors.

7. The apparatus of claim 1, comprising:
a calibration button, embedded within the body of the mobile device, to initiate a calibration process.

8. A method comprising:
overriding a pre-programmed function associated with closure of a lid of a laptop computer;
maintaining a display unit of the laptop computer operational upon closure of the lid;
presenting a visual element on at least a portion of the display unit of the laptop computer while the lid of the laptop computer is in the closed position;
measuring a color attribute of the visual element using one or more first sensors while the lid of the laptop computer is in the closed position;
measuring an ambient light parameter using one or more second sensors different than the one or more first sensors while the lid of the laptop computer is in the closed position; and
calibrating one or more parameters of the display unit based on the measured color attribute and the ambient light parameter.

9. The method of claim 8, comprising:
measuring a parameter selected from the group consisting of:
a Cold-Cathode-Fluorescent-Lamp light parameter, a Light Emitting Diode (LED) backlight parameter, and a temperature parameter,
wherein calibrating the one or more parameters of the display unit takes into account the measured parameter.

10. The method of claim 9, comprising:
periodically re-measuring the parameter; and
initiating a recalibration process based on the re-measured parameter.

11. The method of claim 8, comprising:
detecting that a calibration button, embedded within a body of the laptop computer, is pressed; and
detecting that the lid of the laptop computer is in closed position.

12. The method of claim 8, comprising:
generating a notification to a user to close the lid of the laptop computer upon initiation of a calibration process.

13. The method of claim 12, comprising:
generating a subsequent notification to the user to open the lid of the laptop computer upon completion of the calibration process.

* * * * *